United States Patent
Girotti

(10) Patent No.: US 9,266,991 B2
(45) Date of Patent: Feb. 23, 2016

(54) LOW DENSITY FULL WATER BLOWN POLYURETHANE RIGID FOAM

(71) Applicant: Cecilia Girotti, Correggio (IT)

(72) Inventor: Cecilia Girotti, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/385,407

(22) PCT Filed: Mar. 13, 2013

(86) PCT No.: PCT/EP2013/055089
§ 371 (c)(1),
(2) Date: Sep. 15, 2014

(87) PCT Pub. No.: WO2013/135746
PCT Pub. Date: Sep. 19, 2013

(65) Prior Publication Data
US 2015/0065592 A1    Mar. 5, 2015

(30) Foreign Application Priority Data
Mar. 15, 2012 (IT) .............................. MI2012A0401

(51) Int. Cl.
| | |
|---|---|
| *C08G 18/18* | (2006.01) |
| *C08J 9/08* | (2006.01) |
| *C08G 18/20* | (2006.01) |
| *C08G 18/48* | (2006.01) |
| *C08G 18/08* | (2006.01) |
| *C08G 18/30* | (2006.01) |
| *C08G 18/09* | (2006.01) |
| *C08G 101/00* | (2006.01) |

(52) U.S. Cl.
CPC .............. *C08G 18/14* (2013.01); *C08G 18/092* (2013.01); *C08G 18/18* (2013.01); *C08G 18/1816* (2013.01); *C08G 18/1825* (2013.01); *C08G 18/1841* (2013.01); *C08G 18/2027* (2013.01); *C08G 18/302* (2013.01); *C08G 18/4812* (2013.01); *C08G 18/4816* (2013.01); *C08J 9/08* (2013.01); *C08G 2101/00* (2013.01); *C08G 2101/0025* (2013.01); *C08G 2101/0083* (2013.01)

(58) Field of Classification Search
IPC ................ C08G 18/092,18/14, 18/18, 18/1816, C08G 18/1825, 18/1841, 18/2027, 18/302, 18/4812, 18/4816, 2101/00, 2101/0025, 2101/0083; C08J 9/08
See application file for complete search history.

(56) References Cited

U.S. PATENT DOCUMENTS

| | | | |
|---|---|---|---|
| 3,903,018 A * | 9/1975 | Kolakowski et al. | .......... 502/167 |
| 3,986,991 A * | 10/1976 | Kolakowski et al. | .......... 521/117 |
| 6,602,925 B1 | 8/2003 | Van Den Bosch et al. | |
| 2013/0243986 A1* | 9/2013 | Girotti et al. | ................. 428/36.5 |

FOREIGN PATENT DOCUMENTS

| | | |
|---|---|---|
| EP | 0372539 A2 | 6/1990 |
| EP | 1167414 A1 | 1/2002 |
| EP | 2184305 A1 | 5/2010 |
| WO | 00/04070 A1 | 1/2000 |

OTHER PUBLICATIONS

PCT/EP2013/055089, International Search Report and Written Opinion, Mailed Jun. 17, 2013.

* cited by examiner

*Primary Examiner* — Rabon Sergent

(57) ABSTRACT

A formulation for preparing a low density, full water blown polyurethane rigid foam includes an isocyanate component; an isocyanate-reactive component comprising from 30-50 wt % of a first polyether polyol having a functionality greater than 5 and an OH value from 350-550 $mg_{KOH}/g$; from 5 to 25 wt % of a diol having an OH value from 100-300 $mg_{KOH}/g$; and from 15 to 35 weight percent of a second polyether polyol having a functionality from 3 to 5; further including from 1.5 to 5 wt % of a catalyst selected from dimethylbenzylamine and/or 1,2-dimethyl-imidazole; from greater than 0 to 1 wt % of a trimerization catalyst selected from a glycine salt and/or tris(dimethyl aminomethyl) phenol; greater than 4.1 wt % water as a blowing agent; and any additional constituents selected such that the formulation, excluding the isocyanate component, totals 100 wt % and, the formulation absent the isocyanate component, has a dynamic viscosity from 540 to 864 mPa*s at 20° C. Processing under one-shot conditions can yield a rigid form having a molecular weight per crosslink ratio from 380 to 420. The formulation offers good processability, while the foam shows desirable dimensional stability and mechanical properties at unexpectedly low applied density.

8 Claims, No Drawings

LOW DENSITY FULL WATER BLOWN POLYURETHANE RIGID FOAM

BACKGROUND

1. Field of the Invention

The invention relates to the field of full water blown polyurethane compositions and processes. More particularly, it relates to processes and compositions for preparing full water blown rigid foams that exhibit good foam stability and adhesion even at low densities.

2. Background of the Art

Processes for preparing full water blown rigid polyurethane compositions have been part of a well-established technology that has seen significant commercial success. Such compositions are frequently used in the cold chain industry, to ensure narrow temperature control for products such as pharmaceuticals, vaccines, and food throughout their storage and shipping cycles. However, those involved in relevant industries have long recognized certain problems that often limit application. In particular, full water blown polyurethanes suffer from a relatively high k-factor, due the presence of carbon dioxide inside the foam cells, thereby limiting applications requiring good insulation capability. Furthermore, the final density of the foams is often higher than desired.

The processes to prepare these compositions also may experience difficulties. For example, the foams may be brittle, or suffer from poor adhesion to substrates due to the relatively high urea concentration that often forms on the surface of these foams. The foams may also be dimensionally unstable, due to a relatively high diffusion coefficient of the carbon dioxide through the cell walls, and demold may be poor due to the relatively high exothermic nature of the water-blown reactions. Therefore researchers in the area acknowledge that it is difficult to prepare foams with acceptable mechanical properties wherein the formulated polyol's water content is significantly above about 4 percent by weight (wt %), based on the weight of the formulated polyol as a whole. Thus, there remains a need in the art for new processes and compositions with the ability to utilize high levels of water as the blowing agent to avoid or reduce the problems mentioned above.

SUMMARY OF THE INVENTION

In one aspect the invention provides a composition comprising a formulation for preparing a polyurethane rigid foam, the formulation comprising (1) at least one isocyanate component; (2) at least one isocyanate-reactive component comprising therein (a) from 30 to 50 wt %, based on the total weight of components 2 through 6, of a first polyether polyol, having a hydroxyl value from 350 to 550 milligrams of potassium hydroxide per gram of the polyol ($mg_{KOH}/g$) and a functionality greater than 5; (b) from 5 to 25 wt %, based on the total weight of components 2 through 6, of at least one diol having a hydroxyl value from 100 to 300 milligrams potassium hydroxide per gram of the diol ($mg_{KOH}/g$); and (c) from 15 to 35 wt %, based on the total weight of components 2 through 6, of at least a second polyether polyol, having a functionality from 3 to 5; (3) from 1.5 to 5 wt %, based on the total weight of components 2 through 6, of a catalyst selected from dimethylbenzylamine, 1,2-dimethyl-imidazole, and combinations thereof; (4) from greater than 0 to 1 wt %, based on the total weight of components 2 through 6, of a catalyst selected from a glycine salt, tris(dimethyl aminomethyl)phenol, and combinations thereof; (5) greater than 4.1 wt %, based on the total weight of components 2 through 6, of water as a blowing agent; and, optionally, (6) any additional constituent or constituents; provided that components 2 through 6 totals 100 weight percent and, absent the isocyanate component (1), the formulation has a dynamic viscosity from 540 to 864 millipascals*seconds at 20 degrees Celsius; which, when reacted under one-shot conditions, forms a polyurethane rigid foam having a ratio of molecular weight to crosslink from 380 to 420. The method used to determine the molecular weight per crosslink is reported in Th. Broennumm, *Proceedings of the Society of the Plastics Industry (SPI) Conference* 1991, p. 243.

In another aspect the invention provides a process for preparing a rigid polyurethane foam from this formulation.

DETAILED DESCRIPTION OF THE EMBODIMENTS

The present invention provides a surprisingly low density foam that may, if desired, be blown with only water, yet exhibits good foam formulation processability and mechanical properties including foam dimensional stability. This foam requires several different materials in order to ensure correct initiation, sequencing, control and completion of foam events to obtain the desired balance between flow, polymer strength and performance, and therefore of the desirable inventive compositions.

(1) The Isocyanate Component

In order to prepare the inventive rigid polyurethane foam, it is first necessary to include in the formulation both a polyisocyanate component and an isocyanate-reactive component. The polyisocyanate component is referred to in the United States as the "A-component" (in Europe, as the "B-component"). The part of the formulation not including the isocyanate component is referred to herein as the B-component. Selection of the A-component may be made from a wide variety of polyisocyanates, including but not limited to those that are well known to those skilled in the art. For example, organic polyisocyanates, modified polyisocyanates, isocyanate-based prepolymers, and mixtures thereof may be employed. These can further include aliphatic and cycloaliphatic isocyanates, and in particular aromatic and, more particularly, multifunctional aromatic isocyanates. Also particularly preferred are polyphenyl polymethylene polyisocyanates (PMDI).

Other polyisocyanates useful in the present invention also include 2,4- and 2,6-toluenediisocyanate and the corresponding isomeric mixtures; 4,4'-, 2,4'- and 2,2'-diphenyl-methane-diisocyanate and the corresponding isomeric mixtures; mixtures of 4,4'-, 2,4'- and 2,2'-diphenyl-methanediisocyanates and polyphenyl polymethylene polyisocyanates (PMDI); and mixtures of PMDI and toluene diisocyanates. Also useful for preparing the rigid polyurethanes of the present invention are aliphatic and cycloaliphatic isocyanate compounds such as 1,6-hexamethylene-diisocyanate; 1-isocyanato-3,5,5-trimethyl-1,3-isocyaantomethyl-cyclohexane; 2,4- and 2,6-hexahydro-toluene-diisocyanate, as well as the corresponding isomeric mixtures; 4,4'-, 2,2'- and 2,4'-dicyclohexyl-methanediisocyanate, as well as the corresponding isomeric mixtures. 1,3-tetramethylene xylene diisocyanate may also be used with the present invention.

Also advantageously used for the A-component are the so-called modified multifunctional isocyanates, that is, products which are obtained through chemical reactions of the above diisocyanates and/or polyisocyanates. Exemplary are polyisocyanates containing esters, ureas, biurets, allophanates and preferably carbodiimides and/or uretoneimines; isocyanurate and/or urethane group containing diisocyanates or polyisocyanates. Liquid polyisocyanates containing carbodiimide groups, uretoneimines groups and/or isocyanurate rings, having isocyanate groups (NCO) contents of from 120 to 40 weight percent, more preferably from 20 to 35 weight percent, can also be used. These include, for example, polyisocyanates based on 4,4'- 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI; and mixtures of toluene diisocyanates and PMDI and/or diphenylmethane diisocyanates. Suitable prepolymers for use as the polyisocyanate component of the formulations of the present invention are prepolymers having NCO group contents of from 2 to 40 weight percent, more preferably from 4 to 30 weight percent. These prepolymers are prepared by reaction of the di- and/or poly-isocyanates with materials including lower molecular weight diols and triols, but also can be prepared with multivalent active hydrogen compounds such as di- and tri-amines and di- and tri-thiols. Individual examples are aromatic polyisocyanates containing urethane groups, preferably having NCO contents of from 5 to 40 weight percent, more preferably 20 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkyl diols such as butane diol. Other diols also useful include bishydroxyethyl- or bishydroxypropyl-bisphenol A, cyclohexane dimethanol, and bishydroxyethyl hydroquinone.

Useful as the polyisocyanate component of the prepolymer formulations that may be used in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 2 to 35 weight percent, based on the weight of the prepolymer, prepared by the reaction of polyols, having a functionality of preferably from 1.75 to 4 and a molecular weight of from 800 to 15,000, with 4,4'-diphenylmethane diisocyanate or with a mixture of 4,4'- and 2,4'-diphenylmethane diisocyanate and mixtures of (i) and (ii); and (iii) 2,4' and 2,6-toluene-diisocyanate and the corresponding isomeric mixtures.

PMDI in any of its forms is the most preferred polyisocyanate for use with the present invention. When used, it preferably has an equivalent weight from 125 to 300, more preferably from 130 to 175, and an average functionality of greater than about 1.5. More preferred is an average functionality of from 1.75 to 3.5. The dynamic viscosity of the polyisocyanate component is preferably from 25 to 5,000 centipoises (cPs) (0.025 to about 5 Pascal*seconds (Pa*s)), but values from 100 to 1,000 cPs at 25° C. (0.1 to 1 Pa*s) are preferred for ease of processing. Similar dynamic viscosities are preferred where alternative polyisocyanate components are selected.

In summary, then, the polyisocyanate component of the formulations of the present invention is preferably selected from the group consisting of MDI, PMDI, an MDI prepolymer, a PMDI prepolymer, a modified MDI, and mixtures thereof. The total amount of this polyisocyanate component, regardless of its identification otherwise, is preferably sufficient such that, relative to the isocyanate-reactive component in the formulation, it provides an isocyanate reaction index of from 100 to 300; more preferably the index is from 100 to 200; and still more preferably from 100 to 160. The isocyanate index is the stoichiometric equivalents of isocyanate per equivalent of isocyanate reactive groups times 100.

(2) The Isocyanate-Reactive Component

The second requirement of the inventive formulation is at least one isocyanate-reactive component. By "isocyanate-reactive" is meant that this component has at least one functional group that reacts with an —N=C=O— group. For example, when the functional group is a hydroxyl (—OH—) group, the result is a urethane linkage. When the functional group is an amine (—NH) group, the result is a urea. When the reactant is water ($H_2O$), the result is carbon dioxide. Other reactions may also occur. In the invention this isocyanate-reactive component comprises at least two constituents, as described hereinbelow, and further contains additional constituents, as also described hereinbelow. The isocyanate-reactive component comprises at least three necessary constituents.

(a) A first required constituent of the isocyanate-reactive component is from 30 to 50 wt %, based on the weight of the formulation excluding the isocyanate component (that is, weight percent based on the total weight of the B-component), of a first polyether polyol having a nominal functionality of greater than 5. This polyol has a hydroxyl value from 350 to 550 $mg_{KOH}$/g. In certain preferred embodiments the amount of this component is from 35 to 45 wt %. Unless otherwise indicated, the functionality of the polyol refers to nominal functionality.

Initiator molecules particularly suitable for this constituent are sucrose and/or sorbitol. Sucrose may be obtained from sugar cane or sugar beets, honey, sorghum, sugar maple, fruit, and the like. Means of extraction, separation, and preparation of the sucrose component vary depending upon the source, but are widely known and practiced on a commercial scale by those skilled in the art.

On the other hand, sorbitol is more often obtained via the hydrogenation of D-glucose over a suitable hydrogenation catalyst. Fixed beds and similar types of equipment are especially useful for this reaction. Suitable catalysts may include, for example, Raney™ (Grace-Davison) catalysts, such as employed in Wen, Jian-Ping, et. al., "Preparation of sorbitol from D-glucose hydrogenation in gas-liquid-solid three-phase flow airlift loop reactor," *The Journal of Chemical Technology and Biotechnology*, vol. 4, pp. 403-406 (Wiley Interscience, 2004), incorporated herein by reference in its entirety. Nickel-aluminum and ruthenium-carbon catalysts are just two of the many possible catalysts for this reaction.

Alternatively, preparation of sorbitol may begin with a starch hydrolysate which has been hydrogenated. The starch is a natural material derived from corn, wheat and other starch-producing plants. To form the hydrolysate, the starch polymer molecule may be broken into smaller oligomers at the ether bond between glucose rings, to produce glucose, maltose and higher molecular weight oligo- and poly-saccharides. The resulting molecules, having hemiacetal glucose rings as end units, may then be hydrogenated to form sorbitol, maltitol and hydrogenated oligo- and poly-saccharides. Hydrogenated starch hydrolysates are commercially available and inexpensive, often in the form of syrups, and provide the added benefit of being a renewable resource. This method may further require a separation of either the glucose, prior to hydrogenation, or of the sorbitol after hydrogenation, in order to prepare a suitable sorbitol-initiated polyol therefrom. In general, the hydrogenation reduces or eliminates the end units' tendency to form the hydroxyaldehyde form of glucose. Therefore, fewer side reactions of the sorbitol, such as Aldol condensation and Cannizzaro reactions, may be encountered. Furthermore, the final polyol will comprise reduced amounts of by-products.

The sucrose or sorbitol-initiated polyol may be made by polymerizing alkylene oxides onto the specified initiator in the presence of a suitable catalyst. In one embodiment, each of the initiators may be individually alkoxylated in separate reactions and the resulting polyols blended to achieve the desired component of the formulated polyol. In another embodiment, the initiators may be mixed together prior to alkoxylation, thereby serving as co-initiators, prior to preparing the polyol component having a target hydroxyl number and functionality.

To accomplish the alkoxylation, the alkylene oxide or mixture of alkylene oxides may be added to the initiator(s) in any order, and can be added in any number of increments or added continuously. Adding more than one alkylene oxide to the reactor at a time results in a block having a random distribution of the alkylene oxide molecules, i.e., a so-called heteric block. To make a block polyoxyalkylene of a selected alkylene oxide, a first charge of alkylene oxide is added to an initiator molecule in a reaction vessel. After the first charge, a second charge can be added and the reaction can go to completion. Where the first charge and the second charge have different relative compositions of alkylene oxides, the result is a block polyoxyalkylene. It is frequently preferred to make block polyols in this fashion where the blocks thus formed are either all ethylene oxide, or all propylene oxide, or all butylene oxide, but intermediate compositions are also possible. The blocks can be added in any order, and there may be any number of blocks. For example, it is possible to add a first block of ethylene oxide, followed by a second block of propylene oxide. Alternatively, a first block of propylene oxide may be added, followed by a block of ethylene oxide. Third and subsequent blocks may also be added. The composition of all the blocks is desirably chosen so as to give the final material the properties required for its intended application.

In the present invention, the preferred high functional first polyether polyol, according to one embodiment, is a propoxylated sorbitol-initiated polyol having a molecular weight of from 450 to 900, a functionality of greater than 5, and a hydroxyl number from 350 to 550 mg$_{KOH}$/g. More preferred is a propoxylated sorbitol-initiated polyol which is water co-initiated and contained in a water co-initiated sorbitol-based polyol.

(b) A second required constituent of the formulation is from 5 to 25 wt %, preferably from 10 to 20 wt %, based on the weight of the B-component, of at least one diol, having a hydroxyl value from 100 to 300 mg$_{KOH}$/g. This second required material may be a polyglycol or polyglycol/-polyether polyol combination meeting these functionality and hydroxyl value requirements.

Non-limiting examples of suitable polyglycols (which may also be referred to as polyethylene oxide (PEO) or polyoxyethylene (POE), may include polyethylene glycols (PEGs), polypropylene glycols (PPGs), polybutylene glycols (PBGs) and polyglycol copolymers. Commercially available examples may include the CARBOWAX™ and CARBOWAX SENTRY™ products offered by The Dow Chemical Company. Polyethylene glycol is produced by the interaction of ethylene oxide with water, ethylene glycol, or ethylene glycol oligomers in the presence of acidic or basic catalysts. The latter two are preferred starting materials because polymers resulting therefrom tend to have a lower polydispersity than polymers prepared from ethylene oxide and water. Polypropylene glycol may be prepared in similar fashion, but with propylene glycol or propylene glycol oligomers as starting materials.

(c) A further required constituent of the isocyanate-reactive component is from 15 to 35 wt %, preferably from 20 to 30 wt %, based on the weight of the B-component, of at least one second polyether polyol, having a functionality from 3 to 5. Such may be selected from, for example, the types of polyether polyols suggested hereinabove as suitable selections for the first polyether polyol, or a combination thereof, provided that the functionality meets the specified requirement (from 3 to 5, i.e., it is thereby distinguishable from the first polyether polyol, which has a functionality greater than 5) and that it is not a diol having a hydroxyl value from 100 to 300 mg$_{KOH}$/g, per se, although where it is a mixture of polyols it may include one or more diols having hydroxyl values outside of the 100 to 300 mgKOH/g range.

For example, such at least one second polyether polyol may include, in non-limiting embodiments, glycerin-based polyols having a functionality of 3, or polyols formed from mixtures of initiators such as a high functionality starter (sorbitol/sucrose) and a lower functionality starter such as glycerin to give co-initiated polyols having functionality of from 3 to 5 and preferably a hydroxyl value from 300 to 550 mg$_{KOH}$/g. In addition to production of the second polyether polyol by a mixture of initiators, a blend of polyols may be used to produce a second polyether polyol blend having a functionality of 3 to 5. Other polyols may be selected from both aliphatic and aromatic hydroxyl-containing compounds. Examples of suitable initiator molecules are water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms In the alkyl moiety, such as unsubstituted or mono- or dialkyl-substituted ethylenediamine, diethylenetriamine, triethylenetetramine, 1,3-propylene-diamine, 1,3- and 1,4-butylenediamine, 1,2-, 1,3-, 1,4-, 1,5- and 1,6-hexamethylene-diamine, aniline, phenylene-diamines, 2,3-, 2,4-, 3,4- and 2,6-tolylenediamine, and 4,4'-, 2,4'- and 2,2'-diaminodiphenylmethane.

Other suitable initiator molecules are alkanolamines, for example, ethanolamine, N-methyl- and N-ethylethanolamine; dialkanolamines, for example, diethanolamine, N-methyl- and N-ethyldiethanolamine, and trialkanolamines, for example, triethanolamine and ammonia; and polyhydric alcohols, in particular dihydric and/or trihydric alcohols, such as ethanediol, 1,2- and 1,3-propanediol, diethylene glycol, dipropylene glycol, 1,4-butane-diol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

It is advantageous, in some non-limiting embodiments, that the at least one second polyether polyol is prepared by anionic polyaddition of at least one alkylene oxide, preferably ethylene oxide or 1,2-propylene oxide or a combination thereof, onto, as an initiator molecule, at least one aliphatic or aromatic compound containing at least two reactive hydrogen atoms and also at least one hydroxyl, amino and/or carboxyl group. Examples of such initiator molecules are aromatic polycarboxylic acids, for example, hemimellitic acid, trimellitic acid, trimesic acid and preferably phthalic acid, isophthalic acid and terephthalic acid; mixtures of at least two of the polycarboxylic acids; and hydroxycarboxylic acids, for example, salicylic acid, p- and m-hydroxybenzoic acid and gallic acid. Aminocarboxylic acids, for example, anthranilic acid and m- and p-aminobenzoic acid, may be used, as well as polyphenols, for example, resorcinol, and preferably dihydroxydiphenylmethanes and dihydroxy-2,2-diphenylpropanes. Other possibilities include Mannich condensates of phenols, formaldehyde and dialkanolamines, preferably diethanolamine. Also preferred are aromatic polyamines, for example, 1,2-, 1,3- and 1,4-phenylenediamine and, in particular, 2,3-, 2,4-, 3,4- and 2,6-tolylenediamine, 4,4'-, 2,4'- and 2,2'-diamino-diphenylmethane, polyphenyl-polymethylene-polyamines, mixtures of diamino-diphenylmethanes and polyphenyl-polymethylene-polyamines, as formed, for example, by condensation of aniline with formaldehyde, and combinations thereof.

The preparation of polyether polyols using at least difunctional aromatic initiator molecules of this type is known and described in, for example, DD-A-290 201; DD-A-290 202; DE-A-34 12 082; DE-A-4 232 970; and GB-A-2,187,449; which are incorporated herein by reference in their entireties. The polyether-polyols preferably have a functionality of from 3 to 8, in particular from 3 to 7, and hydroxyl numbers of from 120 to 770, in particular from 200 to 650.

For the at least one second polyether polyol it is also possible to select from Novolac-type polyether polyols.

Suitable Novolac-type polyether polyols may be produced, for example, by reacting a condensate adduct of phenol and formaldehyde with one or more alkylene oxides including ethylene oxide, propylene oxide, and butylene oxide. Such polyols, are known to those skilled in the art, and may be obtained by methods such as are disclosed in, for example, U.S. Pat. Nos. 2,838,473; 2,938,884; 3,470,118; 3,686,101; and 4,046,721; the disclosures of which are incorporated herein by reference in their entireties. Typically, Novolac starting materials are prepared by reacting a phenol (for example, a cresol) with from about 0.8 to about 1.5 moles of formaldehyde per mole of the phenol in the presence of an acidic catalyst to form a polynuclear condensation product containing from 2.1 to 12, preferably from 2.2 to 6, and more preferably from 3 to 5, phenol units per molecule. The Novolac resin is then reacted with an alkylene oxide to form an oxyalkylated product containing a plurality of hydroxyl groups. For the purpose of the present invention, preferred Novolac polyols are those having an average of from 3 to 5 hydroxyl moieties per molecule and an average hydroxyl number from about 100 to about 500, preferably from about 100 to about 300.

These polyether polyols may be used individually or in the form of mixtures, for example, of polyether polyols containing at least one polyether polyol based on an aromatic, polyfunctional initiator molecule and at least one polyether polyol based on a non-aromatic initiator molecule, preferably a trihydric to octahydric alcohol. Other combinations of polyether polyols may also be selected.

(3)/(4) Two other required components of the invention are two specified catalysts, designated herein as (3) and (4). Polyurethane catalysts generally serve one or more of three functions, namely, to promote curing, blowing and/or trimerization. It is preferred that the catalyst package as a whole serves at least two of these three functions in the invention. It is further preferred that all three functions are satisfied.

While it is known that some catalysts may promote both blowing and curing (so-called "balanced" catalysts), such are conventionally differentiated by their tendency to favor the blow reaction (i.e., the reaction between either urea or water and the isocyanate), or the cure reaction (i.e., the reaction between either urethane or polyol and the isocyanate). In some non-limiting embodiments, a catalyst that technically may catalyze both blowing and curing may be selected for its less-favored tendency, e.g., curing, and combined with another catalyst directed more toward the other purpose, e.g., blowing.

Thus, a particular feature of the present invention is that it employs a catalyst package including at least two specific catalysts. The first catalyst, denominated as this component (3), is an amine-based catalyst, believed to operate primarily as a curing catalyst, selected from dimethylbenzylamine (DMBA), 1,2-dimethyl-imidazole, and combinations thereof. DMBA may be obtained from, for example, Rhein Chemie, and 1,2-dimethyl-imidazole is sold under the trade designation DABCO 2039 by Air Products and Chemicals Inc. Combinations of the DMBA and the 1,2-dimethyl-imidazole may also be employed. The total amount of DMBA, 1,2-dimethyl-imidazole, or combination thereof may range from 1.5 to 5 wt %, based on the weight of the B-component.

(4) The second required catalyst is a trimerization catalyst selected from a glycine salt, tri(dimethyl aminomethyl)phenol), and combinations thereof, in an amount ranging from greater than 0 to 1 wt %, based on the weight of the B-component. Preferably this catalyst is present in an amount from 0.01 to 1.0 wt %, more preferably from 0.01 to 0.6 wt %, and most preferably from 0.1 to 0.6 wt %, on the same basis. An example of this type of catalyst is CURITHANE 52, a glycine salt which is N-[(2-hydroxy-5-nonylphenyl)methyl]-N-methyl-monosodium salt in diethylene glycol, available from Air Products and Chemicals, Inc.

(5) A particular feature of the present invention is the amount of water used as a blowing agent. In amount the water is desirably greater than 4.1 wt %, based on the weight of the B-component. More desirably the amount of water is greater than 4.2 wt %, and still more desirably greater than 4.3 wt %, on the same basis. An amount of water that is less than or equal to 5.0 wt % is preferred. In some preferred embodiments water is used as the sole blowing agent. In alternative embodiments one or more additional chemical blowing agents may be included in the formulation with the water. Where additional chemical blowing agents are included, it is preferred that such be in total amount not greater than 1.0 wt %. In one non-limiting embodiment, formic acid or another organic acid may be selected for inclusion with the water.

(6) Optional Additional Formulation Components

The remainder of the formulation, to a total of 100 wt %, may include, accordingly and in non-limiting embodiments, additives such as chain extenders, fillers, pigments, property modifiers such as fire retardants, and other additives such as will be generally familiar to those skilled in the art. Of particular note is that very minor amounts (less than 1.5 wt % total, based on weight of the B-component) of other catalysts may be included in the inventive formulations and may be directed toward blowing and/or curing and/or trimerization. Such may include, but are not limited to, amine-based catalysts other than DMBA. For example, the total catalyst package may include pentamethyldiethylenetriamine, which is sold under the trade designation POLYCAT 5 by Air Products and Chemicals, Inc., and/or DMCHA, a N,N-dimethylcyclohexyl amine, sold under the trade designation POLYCAT 8 by Air Products and Chemicals, Inc. In general, short chain tertiary amines or tertiary amines containing at least an oxygen may tend to promote blowing in particular and may include bis-(2-dimethylaminoethyl)ether; pentamethyl-diethylene-triamine, triethylamine, tributyl amine, N,N-dimethylaminopropylamine, dimethylethanolamine, N,N,N',N'- tetra-methylethylenediamine, urea, and combinations thereof. In one particular embodiment, a combination of bis (dimethyl-aminoethyl)ether and dipropylene glycol may be employed, for example, in a 70/30 weight percent ratio. Combinations of any of the above may also be selected.

Optional additional curing catalysts (still included within the maximum allowed additional catalyst limit of 1.5 wt %, as mentioned hereinabove) may include, generally, amidines, longer chain tertiary amines, organo-metallic compounds, and combinations thereof. These may include, but are not limited to, amidines such as 1,8-diazabicyclo[5.4.0]undec-7-ene and 2,3-dimethyl-3,4,5,6-tetrahydro-pyrimidine, salts thereof, and combinations thereof.

The organometallic compounds may include organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate. Bismuth salts of organic carboxylic acids may also be selected, e.g., bismuth octanoate. The organometallic compounds may be selected for use alone or in combinations, or, in some embodiments, in combination with one or more of the highly basic amines listed hereinabove.

Further examples of additional catalysts allowable within the maximum limitation of 1.5 wt % mentioned hereinabove, generally capable of promoting both blowing and curing reactions, are cyclic tertiary amines and long chain amines containing several nitrogen atoms, such as triethylamine, tributylamine, dimethyl-benzylamine, N-methyl-, N-ethyl-, and N-cyclohexyl-morpholine, N,N,N',N'-tetramethyl-ethylenediamine, N,N,N',N'-tetramethyl-butanediamine and -hexanediamine, penta-methyl-diethylenetriamine, tetramethyl-diaminoethyl ether, bis(dimethylaminopropyl)urea, dimethyl-piperazine, dimethyl-cyclohexylamine, 1,2-dimethyl-imidazole, 1-aza-bicyclo[3.3.0]octane, triethylene-diamine (TEDA), and combinations thereof.

In another embodiment, alkanolamine compounds may be employed. Such may include triethanolamine, triisopropanolamine, N-methyl- and N-ethyldiethanolamine, dimethyl-ethanolamine, and combinations thereof.

Non-limiting examples of commercially available blowing, curing or blowing/curing catalysts include NIAX A-4, NIAX A6, POLYCAT 6, POLYCAT 5, POLYCAT 8, NIAX A1; POLYCAT 58, DABCO T, DABCO NE 300, TOYOCAT RX 20, DABCO DMDEE, JEFFCAT ZR 70, DABCO 33 LV, NIAX A-33, DABCO R-8020, NIAX TMBDA, POLYCAT 77, POLYCAT 6, POLYCAT 9, POLYCAT 15, JEFFCAT ZR 50, TOYOCAT NP, TOYOCAT F94, DABCO NEM, and the like. POLYCAT™ and DABCO™ are available from Air Products; TOYOCAT™ catalysts are available from Tosho Corporation; NIAX™ Catalysts are available from Momentive Performance Material; and JEFFCAT™ catalysts are available from Huntsman.

Examples of additional trimerization catalysts (still limited such that the total amount of additional catalyst(s) does/do not exceed the 1.5 wt % maximum) include tris(dialkylaminoalkyl)-s-hexahydrotriazines, such as 1,3,5-tris(N,N-dimethylaminopropyl)-s-hexahydrotriazine; DABCO TMR 30; DABCO K 2097 (potassium acetate), DABCO K15 (potassium octoate); POLYCAT 41, POLYCAT 43, POLYCAT 46, DABCO TMR, tetraalkylammonium hydroxides such as tetramethylammonium hydroxide; alkali metal hydroxides such as sodium hydroxide; alkali metal alkoxides such as sodium methoxide and potassium isopropoxide; alkali metal salts of long-chain fatty acids having from 10 to 20 carbon atoms and, in some embodiments, pendant hydroxyl groups; and combinations thereof. Some of these catalysts are solids or crystals and can be dissolved in a suitable solvent. Among such solvents are one or more of the polyols, water, dipropylene glycol or any other carrier useful in the polyurethane foaming composition.

Further additives or modifiers such as are well-known in the art may also be included in the formulation composition as a whole. For example, surfactants, flame retardants, crosslinkers and/or fillers may be employed. Flame retardants may include one or more brominated or non-brominated compounds, such as diammonium phosphate, various halogenated aromatic compounds, antimony oxide, alumina trihydrate, polyvinyl chloride, and combinations thereof. Halogen free flame retardants, particularly phosphorus-based halogen free flame retardants, may be particularly useful. When present, the flame retardant is present in an amount of 5 to 15 weight percent of the B-component. Dispersing agents, cell stabilizers, and surfactants may also be incorporated into the formulations.

Surfactants, including organic surfactants and silicone based surfactants, may be added to serve as cell stabilizers. Some representative materials are sold under the designations SF-1109, L-520, L-521 and DC-193, which are, generally, polysiloxane polyoxylalkylene block copolymers, such as those disclosed in U.S. Pat. Nos. 2,834,748; 2,917,480; and 2,846,458, the disclosures of which are incorporated herein by reference in their entireties. Also included are organic surfactants containing polyoxy-ethylene-polyoxybutylene block copolymers, as are described in U.S. Pat. No. 5,600,019, the disclosure of which is incorporated herein by reference in its entirety. It is particularly desirable to employ a minor amount of a surfactant to stabilize the foaming reaction mixture until it cures. Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, a surfactant total amount from about 0.2 to about 3 wt %, based on the formulation as a whole, is sufficient for this purpose. However, it may be in some embodiments desirable to include some surfactants, e.g., DABCO DC-5598, available from Air Products and Chemicals, Inc., in a higher amount. In view of this a surfactant may be included in the inventive formulations in any amount ranging from 0 to 6 wt %, based on the B-component.

Finally, other additives such as fillers and pigments may be included in the inventive rigid polyurethane foam formulations. Such may include, in non-limiting embodiments, barium sulfate, calcium carbonate, graphite, carbon black, titanium dioxide, iron oxide, microspheres, alumina trihydrate, wollastonite, prepared glass fibers (dropped or continuous), polyester fibers, other polymeric fibers, combinations thereof, and the like. Those skilled in the art will be aware without further instruction as to typical and suitable means and methods to adapt the inventive formulations to produce rigid polyurethane foams that, though still falling within the scope of the claims appended hereto, exhibit or benefit from desired property and/or processing modifications.

Other additives include specialty polyols such as melamine/polyether-polyol dispersions as described in EP-A-23 987 (U.S. Pat. No. 4,293,657), polymer/polyether polyol dispersions prepared from polyepoxides and epoxy resin curing agents in the presence of polyether polyols, as described in DE 29 43 689 (U.S. Pat. No. 4,305,861), dispersions of aromatic polyesters in polyhydroxyl compounds, as described in EP-A-62 204 (U.S. Pat. No. 4,435,537) and DE-A 33 00 474, dispersions of organic and/or inorganic fillers in polyhydroxyl compounds, as described in EP-A-11 751 (U.S. Pat. No. 4,243,755), polyurea/polyether-polyol dispersions, as described in DE-A-31 25 402, tris(hydroxyalkyl) isocyanurate/polyether-polyol dispersions, as described in EP-A-136 571 (U.S. Pat. No. 4,514,426), and crystallite suspensions, as described in DE-A-33 42 176 and DE-A-33 42 177 (U.S. Pat. No. 4,560,708), all such patent publications being incorporated herein by reference in their entireties.

Other types of additives that may be useful in the present invention include those wherein nucleating agents, such as liquid perfluoroalkanes and hydrofluoroethers, and inorganic solids, such as unmodified, partially modified and modified clays, including, for example, spherical silicates and aluminates, flat laponites, montmorillonites and vermiculites, and particles comprising edge surfaces, such as sepiolites and kaolinite-silicas. Organic and inorganic pigments and compatibilizers, such as titanates and siliconates, may also be included in useful polyol dispersions as or as part of the at one second polyether polyol.

The B-component as a whole totals 100 wt %; that is the total formulation excluding the isocyanate component. Of particular note is that the formulation as a whole, absent the isocyanate component, desirably has a dynamic viscosity from 540 to 864 mPa*s at 20° C. In order to ensure a correct dynamic viscosity, viscosity-cutting additives, including in non-limiting examples, triethyl phosphate, propylene carbonate, combinations thereof, and the like, such as are well-known to those skilled in the art, may be included when necessary.

Foam Preparation

The low density, primarily or fully water blown polyurethane foam prepared according to the process of this invention is a rigid, foamed, closed-cell polymer. Such a polymer is typically prepared by intimately mixing all of the reaction components, though mixing protocol may be tailored according to preference and/or equipment capabilities. In one embodiment, the isocyanate-reactive component, required catalysts, and any additional components, as allowed and desired, may be combined in one stream; the water as a primary or sole blowing agent may represent a second stream; and the isocyanate component may be a third stream. These three streams may then be simultaneously combined in, for example, a mixhead, with or without a static mixer, for injection into an appliance cavity. In another embodiment, the isocyanate-reactive component, catalysts, additional components and water may be combined as one stream and the isocyanate component may be a second stream. Other protocols may also be selected. Mixing may be carried out at room temperature or at a slightly elevated temperature over a short period. The reacting mixture is then poured or otherwise deposited onto a flat substrate, such as a rigid or flexible facing sheet made of foil or another material which is being conveyed along a production line, or into a cavity or container wherein the inner surface or surfaces for a substrate for the rigid polyurethane foam. In these container embodiments the reacting mixture may be deposited into an open mold or distributed via laydown equipment into an open mold or simply deposited at or, as noted hereinabove, into any location for which it is destined, i.e., a pour-in-place application, such as between the interior and exterior walls of a structure such as a refrigeration appliance. In the case of deposition on a facing sheet, a second sheet may be applied on top of the deposited mixture. In other embodiments, the mixture may be injected into a closed mold, with or without vacuum assistance for cavity-filling. If a mold is employed, it is most typically heated prior to deposition of the reacting mixture.

In general, such applications may be accomplished using the well-known one-shot technique together with conventional mixing methods. The mixture, on reacting, takes the shape of the mold or adheres to the substrate to produce a three-dimensional rigid polyurethane polymer of a relatively predefined shape and internal structure, which is then allowed to cure in place or in the mold, either partially or fully. Suitable conditions for promoting the curing of the polymer include a temperature of typically from 20° C. to 60° C., preferably from 35° C. to 55° C., and more preferably from 40° C. to 50° C. Such temperatures will usually permit the sufficiently cured polymer to be removed from the mold, typically within from 1 to 60 minutes and more typically within from 5 to 40 minutes after mixing of the reactants. Optimum demold time will generally depend, to a significant extent, upon the thickness of the produced foam. Furthermore, optimum cure conditions will depend upon the particular components selected for the formulation, including in particular the catalysts and quantities used in preparing the polymer and also the size and shape of the article manufactured.

The result may be a rigid foam in the form of slabstock, a molding, a filled cavity, including but not limited to a pipe or filled and/or insulated wall or hull structure, a sprayed foam, a frothed foam, or a continuously- or discontinuously-manufactured laminated product, including but not limited to a laminated product formed with other materials, such as hardboard, plasterboard, plastics, paper or metal. In one particular embodiment, the inventive rigid foams may be useful in commercial appliances, professional displays, and some types of machinery applications. Advantageously, the inventive polyurethane formulations and produced foams may exhibit desirable foam processability and mechanical properties, including adhesion to a substrate and dimensional stability, at surprisingly low applied density, in comparison with traditional water blown foams that have been prepared using blowing agents other than, or in addition to, water, This greater stability is attributable to the invention's attainment of a desirable ratio of molecular weight to crosslink density ranging from 380 to 420 when a foam is prepared having a ratio of the A-component to isocyanate reactive moieties ranging from 100 to 160, that is to say, an isocyanate index of from 1 to 1.6.

The description hereinabove is intended to be general and is not intended to be inclusive of all possible embodiments of the invention. Similarly, the examples hereinbelow are provided to be illustrative only and are not intended to define or limit the invention in any way. Those skilled in the art will be fully aware that other embodiments, within the scope of the claims, will be apparent from consideration of the specification and/or practice of the invention as disclosed herein. Such other embodiments may include selections of specific components and constituents and proportions thereof; mixing and reaction conditions, vessels, deployment apparatuses, and protocols; performance and selectivity; identification of products and by-products; subsequent processing and use thereof; and the like; and that those skilled in the art will recognize that such may be varied within the scope of the claims appended hereto.

EXAMPLES

The materials used in the Examples are listed and described in Table 1. Unless specified otherwise, the amount of materials are parts by weight.

TABLE 1

Materials used in Examples 1-2 and Comparative Example A.

| Material Designation | Description | Amount Ex. 1 | Amount Ex. 2 | Amount C. Ex. A % |
|---|---|---|---|---|
| Polyol 1* | Sorbitol-initiated polyoxypropylene polyether polyol, having an OH number of 482, a nominal functionality of 6, and an equivalent weight of 117. | — | 34 | 40.4 |
| Polyol 2* | Sucrose-glycerine-initiated polyoxypropylene polyol having an OH number of about 360, a functionality of about 4.6 and an equivalent weight of 156. | 15.9 | 16 | 16.5 |
| Polyol 3* | Sorbitol-water-initiated propoxylated polyether polyol having an OH number of 460, a functionality of 5.4, and an equivalent weight of 122. | 39.8 | — | — |
| Polyol 4* | A triol (glycerin) initiated polyoxypropylene polyol with a molecular weight of about 1000 and a functionality of 3. | 17.9 | 18 | 18 |
| Polyol 5* | Polypropylene glycol, having a functionality of 2, a molecular weight of about 1000 and an OH number of 110. | 9 | 9 | 9 |
| DPG* | Dipropylene glycol | — | 1.5 | — |
| Polyol 6* | Polyethylene glycol having a functionality of 2, an OH number of 216, and an average molecular weight of about 400. | — | 4.5 | — |
| Fire retardant**** | Phosphorus-based, halogen-free flame retardant | 8 | 8 | 8 |
| Silicone surfactant** | | 2 | 2 | 2 |
| Catalyst 1*** | Tertiary amine catalyst | 0.1 | 0.1 | 0.1 |
| Catalyst 2*** | Tertiary amine catalyst | 0.2 | 0.2 | 0.4 |
| Catalyst 3*** | Dimethyl benzyl amine (DMBA) | 2.4 | 2 | 1.1 |
| Catalyst 4* | Trimerization catalyst (not a (4) selection) | — | — | 0.4 |
| Catalyst 5*** | Glycine salt, N-[(2-hydroxy-5-nonylphenyl)methyl]-N-methyl-monosodium salt in diethylene glycol | 0.3 | 0.3 | — |
| Water | | 4.4 | 4.4 | 4.05 |
| Total | | 100.0 | 100.0 | 100.0 |
| PMDI | Polymethylene polyphenylisocyanate | 153 | 155 | 150 |
| ISO/POL***** | | 153/100 | 155/100 | 150/100 |

*Available from The Dow Chemical Company
**Available from Th. Goldschmidt
***Available from Air Products and Chemicals, Inc.
****Available from Rhein Chemie
****Available from Eastman
*****POL refers to isocyanate-reactive component plus catalysts, water, and any optional additional components Examples 1-2 and Comparative Example A The materials are combined as Example 1, Example 2, and Comparative Example A compositions, according to Table 1, in a Cannon A40 high pressure machine. A 16/12 millimeter (mm) L-head is used with the following process conditions: mixing pressure of 150 bar (about 15,000 kPa); polyol and isocyanate temperature of 20-22° C. and output of 200 grams per second (g/s), unless otherwise indicated. Samples taken from a Brett mold (200×20×5 cm) are used to measure minimum fill density (MFD), average density distribution (ADD), compressive strength, dimensional stability and adhesion. Foams are evaluated during foam formation and via testing thereafter with the results shown in Table 2. The data listed are from 10% overpack foams. Reactivity and free rise density measurements are taken from bag foamed parts. Further information concerning testing protocols is provided hereinbelow:

Free rise density (FRD) and reactivity. A free rise foam is poured into a polyethylene bag of dimensions 50×40 centimeters (cm) placed into a wooden box of 20×20×20 cm and the reaction parameters (cream, gel and tack free time) are then determined. The free rise density is determined after 30 minutes by cutting the specimen into a regular shape that is as large as possible.

Mechanical properties. Compressive strength is measured according to EN 826 standard. The test is performed on the 10×10×5 cm specimens, cut from Brett panels, in the direction perpendicular to rise (foam thickness). The compressive strength is reported as the average value of five (5) specimens taken in different positions covering the whole panel length.

Dimensional stability. The test is performed according to EN 1604 standard, conditioning the specimens, which are 8×8×4 cm, at both high (80° C.) and low (−25° C.) temperature for 20 hours.

Tensile bond strength (TBS, an adhesion test). This test is performed according to EN 14509 (European product standard for sandwich panels), which refers to EN 1607. The foam sample's adhesion to the two facings (top and bottom) is measured simultaneously through a tensile test, perpendicular to the faces of the specimens.

TABLE 2

Foam processing results.

| Property | Example 1 | Example 2 | Comparative Example A |
|---|---|---|---|
| Dynamic Viscosity (mPa * s at 20° C.) | 810 | 766 | 1188 |
| MW per crosslink | 404 | 402 | 378.9 |
| Cream Time (sec) | 11 | 13 | 9 |

TABLE 2-continued

Foam processing results.

| Property | Example 1 | Example 2 | Comparative Example A |
|---|---|---|---|
| Gel Time (sec) | 67 | 67 | 65 |
| Free Rise Density (kg/m³) | 29.1 | 29 | 29.7 |
| BRETT MOLD at 40° C. | | | |
| Minimum fill density (kg/m³) BRETT MOLD at 40° C. with 10% overpack, demold time (DMT) 14 min | 37.1 | 37.9 | 40.6 |
| Molded Density (kg/m³) | 40.8 | 41.7 | 44.6 |
| Average Density Distribution | 0.56 | 0.38 | 0.85 |
| Average Compressive Strength Overall (kPa) | 202 | 204 | 224 |
| DIMENSIONAL STABILITY −25° C. (linear variation %) | 0.1 | 0.1 | 0.1 |
| DIMENSIONAL STABILITY +80° C. (linear variation %) | 0.8 | 0.7 | 0.9 |
| Tensile Bond Strength, average (kPa) | 152 | 155 | 165 |

The data shown in Table 2 illustrate that, in comparison with a polyurethane rigid foam prepared from a formulation that is similar but lacks certain key features of the inventive formulations, the inventive formulations may exhibit improved flow properties while forming lower density polyurethane rigid foams that attain desirable levels of mechanical properties such as foam dimensional stability. Without wishing to be bound by any theory as to specific reactions, kinetics, or sequencing occurring in any of the inventive embodiments, it is suggested that these improved foam properties are attributable to, in particular, the higher ratio of molecular weight per crosslink and lower viscosity of the inventive embodiments than results when polyurethane rigid foams are prepared from certain conventional rigid foam formulations, including, surprisingly, even some using less water than the inventive formulations.

The invention claimed is:

1. A composition comprising
a formulation for preparing a polyurethane rigid foam, the formulation comprising
(1) at least one isocyanate component;
(2) at least one isocyanate-reactive component comprising
   (a) from 30 to 50 weight percent, based on the total weight of components 2 through 6, of a first polyether polyol, having a hydroxyl value from 350 to 550 milligrams of potassium hydroxide per gram of the polyol and a functionality greater than 5;
   (b) from 5 to 25 weight percent, based on the total weight of the components 2 through 6, of at least one diol having a hydroxyl value from 100 to 300 milligrams potassium hydroxide per gram of the diol; and
   (c) from 15 to 35 weight percent, based on the total weight of components 2 through 6, of at least a second polyether polyol, having a functionality from 3 to 5, the diol being different from the first polyether polyol and the second polyether polyol;
(3) from 1.5 to 5 weight percent, based on the total weight of components 2 through 6, of a catalyst selected from dimethylbenzylamine, 1,2-dimethyl-imidazole, and combinations thereof;
(4) from greater than 0 to 1 weight percent, based on the total weight of components 2 through 6, of a catalyst selected from a glycine salt, tris(dimethyl aminomethyl) phenol, and combinations thereof;
(5) greater than 4.1 wt %, based on the total weight of components 2 through 6, of water as a blowing agent; and, optionally,
(6) any additional constituent or constituents;
wherein the weight of components 2 through 6 totals 100 weight percent and, absent the at least one isocyanate component (1), the formulation has a dynamic viscosity from 540 to 864 millipascals*seconds at 20 degrees Celsius; and
components 1 through 6, when reacted under one-shot conditions, form a polyurethane rigid foam having a ratio of molecular weight to crosslink from 380 to 420.

2. The composition of claim 1, wherein component (6) includes from 5 to 15 weight percent, based on the weight of components 2 through 6, of a phosphorus-based, halogen free flame retardant.

3. The composition of claim 1, wherein the isocyanate component is selected from the group consisting of 4,4'-, 2,4'- and 2,2'-diphenylmethanediisocyanate; 2,4- and/or 2,6-toluenediisocyanate; mixtures of diphenylmethane diisocyanates and polyphenyl polymethylene polyisocyanate; mixtures of toluenediisocyanates and polyphenyl polymethylene polyisocyanate; and polyphenyl polymethylene polyisocyanate.

4. The composition of claim 1, wherein the first polyether polyol (2)(a) is selected from the group consisting of propoxylated sorbitol-initiated polyols having a molecular weight from 450 to 900.

5. The composition of claim 1, wherein the diol (2)(b) is selected from the group consisting of polyethylene glycols, polypropylene glycols, polybutylene glycols, and combinations thereof.

6. The composition of claim 1, wherein the amount of water as a blowing agent (5) is from greater than 4.1 weight percent to 5.0 weight percent, based on the total weight of component 2 through 6.

7. The composition of claim 6, wherein the amount of water as a blowing agent (5) is from 4.2 weight percent to 5.0 weight percent.

8. A process for preparing a rigid polyurethane foam comprising reacting a formulation comprising
(1) at least one isocyanate component;
(2) at least one isocyanate-reactive component comprising
   (a) from 30 to 50 weight percent, based on the total weight of components 2 through 6, of a first polyether polyol, having a hydroxyl value from 350 to 550 milligrams of potassium hydroxide per gram of the polyol and a functionality greater than 5;
   (b) from 5 to 25 weight percent, based on the total weight of the components 2 through 6, of at least one diol having a hydroxyl value from 100 to 300 milligrams potassium hydroxide per gram of the diol; and
   (c) from 15 to 35 weight percent, based on the total weight of components 2 through 6, of at least a second polyether polyol, having a functionality from 3 to 5, the diol being different from the first polyether polyol and the second polyether polyol; in the presence of
(3) from 1.5 to 5 weight percent, based on the total weight of components 2 through 6, of a catalyst selected from dimethylbenzylamine, 1,2-dimethyl-imidazole, and combinations thereof;
(4) from greater than 0 to 1 weight percent, based on the total weight of components 2 through 6, of a catalyst selected from a glycine salt, tris(dimethyl aminomethyl) phenol, and combinations thereof;

(5) greater than 4.1 wt %, based on the total weight of components 2 through 6, of water as a blowing agent; and, optionally, (6) any additional constituent or constituents;

wherein the weight of components 2 through 6 totals 100 weight percent and, absent the at least one isocyanate component (1), the formulation has a dynamic viscosity from 540 to 864 millipascals*seconds at 20 degrees Celsius; and components 1 through 6, when reacted under one-shot conditions, form a polyurethane rigid foam having a ratio of molecular weight to crosslink from 380 to 420.

* * * * *